(12) United States Patent
Lu et al.

(10) Patent No.: US 10,334,688 B2
(45) Date of Patent: Jun. 25, 2019

(54) DETECTION CIRCUIT AND LED TUBE INCLUDING THE SAME

(71) Applicant: SIGNIFY HOLDING B.V., Eindhoven (NL)

(72) Inventors: Han Lu, Eindhoven (NL); Jingxu Zhou, Eindhoven (NL); DeYong Kong, Eindhoven (NL)

(73) Assignee: SIGNIFY HOLDING B.V., Eindhoven (NL)

(*) Notice: Subject to any disclaimer, the term of this patent is extended or adjusted under 35 U.S.C. 154(b) by 0 days.

(21) Appl. No.: 15/683,501

(22) Filed: Aug. 22, 2017

(65) Prior Publication Data
US 2018/0324925 A1 Nov. 8, 2018

(30) Foreign Application Priority Data

May 4, 2017 (CN) .......................... 2017 1 0309214

(51) Int. Cl.
H05B 33/08 (2006.01)
F21Y 115/10 (2016.01)
F21Y 103/10 (2016.01)

(52) U.S. Cl.
CPC ..... *H05B 33/0884* (2013.01); *H05B 33/0842* (2013.01); *F21Y 2103/10* (2016.08); *F21Y 2115/10* (2016.08)

(58) Field of Classification Search
CPC ............ H05B 33/0884; H05B 33/0842; F21Y 2115/10; F21Y 2103/10; H01H 83/00; H01H 83/10; H01H 83/12; H01H 83/14; H01H 2009/546; H01H 77/00; H01H 83/16; H01H 83/22; G05F 1/565; G05F 1/569; G05F 1/571; G05F 1/575; H01L 23/60; H01L 27/0248; H02H 3/22; H02H 9/046; H02H 3/027; H02H 3/093; H02H 3/0935; H02H 3/247; H02H 3/20; H02H 3/207; H02H 3/24; H05K 1/0259
See application file for complete search history.

(56) References Cited

U.S. PATENT DOCUMENTS 6,348,833 B1 * 2/2002 Tsujimoto ............... G05F 1/575
327/143
2012/0176714 A1 7/2012 Cheng
(Continued)

FOREIGN PATENT DOCUMENTS

CN 202059618 U 11/2011
DE 102013108775 A1 2/2015

*Primary Examiner* — Alexander H Taningco
*Assistant Examiner* — Renan Luque

(57) ABSTRACT

Embodiments of the present disclosure involve a detection circuit for a tube and a tube including the detection circuit. The detection circuit comprises: impedance connected between two ends of a tube; a voltage detector configured to detect voltage on the impedance; a voltage threshold circuit configured to provide a voltage threshold; a first control circuit configured to compare voltage across the two ends of the tube to the voltage threshold, and to control the voltage detector to detect only when the voltage across the two ends of the tube is smaller than the voltage threshold. By using the detection circuit of the present disclosure, it can detect whether a human body contacts the tube under protection state, to avoid of the risk of getting an electrical shock.

14 Claims, 8 Drawing Sheets

(56) References Cited

U.S. PATENT DOCUMENTS

| | | | |
|---|---|---|---|
| 2013/0063044 A1* | 3/2013 | Huang | H05B 33/0803 |
| | | | 315/294 |
| 2014/0015345 A1* | 1/2014 | Ivey | H02H 9/02 |
| | | | 307/326 |
| 2017/0159923 A1* | 6/2017 | Liu | F21V 25/02 |
| 2017/0171924 A1* | 6/2017 | Na | H05B 33/0815 |
| 2017/0171937 A1* | 6/2017 | Hsia | H05B 33/0887 |
| 2017/0311397 A1* | 10/2017 | Hsia | H05B 33/089 |
| 2018/0054870 A1* | 2/2018 | Yanagizu | H05B 33/0884 |
| 2018/0241195 A1* | 8/2018 | Zhang | H05B 37/00 |

* cited by examiner

DETECTION CIRCUIT AND LED TUBE INCLUDING THE SAME

RELATED APPLICATION

This application claims the benefit of foreign priority to Chinese patent application no. CN201710309214.0, filed on May 4, 2017, in the State Intellectual Property Office (SIPO) of the People's Republic of China, the entire contents of which are incorporated herein by reference for all purposes.

TECHNICAL FIELD

Embodiments of the present disclosure generally relate to the lighting field. More specifically, embodiments of the present disclosure relate to a light-emitting diode (LED) tube and a detection circuit in the LED tube.

BACKGROUND

LED tubes have been extensively used, e.g., for room lighting and providing light for reading, etc. An LED tube usually is installed on a matched socket, which is normally connected to the mains supply voltage, such as, 220V alternating voltage. Thus, there is a risk of getting an electric shock when the fingers contact the LED tube base while installing or replacing the LED tube.

For example, CN202059618U provides a circuit for detecting a touch on the tube terminal by human.

SUMMARY

The prior art detects whether the tube terminal is touched by humans simply by the voltage division of the impedance. However, its drawback lies in that: for example, the 220V mains supply ranges from 0 to 310 volts and when the prior art detects at a high mains supply voltage, the voltage on human body through voltage division may have a higher value, which is not safe for the human body. Regarding the above and other potential issues, the technical solution of the present disclosure provides a detection circuit for a LED tube and the LED tube using the detection circuit.

According to one aspect of the present disclosure, a detecting circuit for a tube is provided, comprising: impedance connected between two ends of a tube; a voltage detector configured to detect voltage on the impedance; a voltage threshold circuit configured to provide a voltage threshold; a first control circuit configured to compare voltage across the two ends of the tube to the voltage threshold, and to control the voltage detector to detect only when the voltage across the two ends of the tube is smaller than the voltage threshold.

The advantage of this aspect is that the input voltage will not be too high during detection, which better protects human safety.

In some embodiments, the voltage threshold is not greater than 30 volts.

The embodiment provides a specific voltage range for detection and the human safety can be better secured when the voltage is lower.

In some embodiments, the detection circuit also comprises a second control circuit configured to enable the voltage detector when a voltage threshold circuit is charged to a starting voltage.

This embodiment provides a triggering mechanism to enable the voltage detector to avoid the continuous work of the voltage detector, which reduces the detection current applied to human body per unit of time and better secures human safety.

The first control circuit is configured to compare the voltage between input ends of the tube with the starting voltage that acts as the voltage threshold, and to control the voltage detector to detect only when the voltage between input ends of the tube is smaller than the starting voltage.

By using the starting voltage, this embodiment realizes two purposes: a threshold for low voltage detection and a triggering mechanism for intermittently trigger the low voltage detection to implement compact circuit architecture with lower costs.

In some embodiments, the voltage threshold circuit comprises a first capacitor and the detection circuit comprises a first charging loop configured to charge the first capacitor.

The embodiment uses the capacitor to generate the starting voltage, which costs less.

In some embodiments, the first charging loop is configured to set the time required for the initial charge of the capacitor to reach the starting voltage as: from 90 milliseconds when the input voltage is 230 volts to 260 milliseconds when the input voltage is 90 volts.

In some embodiments, the detection circuit comprises a first discharging loop configured to discharge the first capacitor when the voltage detector starts the detection.

In some embodiments, the first discharging loop is configured to set the time for discharging the first capacitor to be smaller than the starting voltage as less than 1 millisecond. The first charging loop is configured to set the time range required for the recharge of the discharged capacitor to reach the starting voltage as: from 50 milliseconds when the input voltage is 230 volts to 200 milliseconds when the input voltage is 90 volts.

The embodiments limit the specific period for detection and reduce the detection current passing by the human body by using a longer detection period.

In some embodiments, the detection circuit also comprises a timing circuit configured to enable the voltage threshold circuit and the first control circuit before the timing expires, and to disable the voltage threshold circuit and the first control circuit when the timing is expired.

The embodiments limit the total length of time when the detection circuit is in a detection status and the detection circuit will no longer continue to detect after a plurality of detections within the total length of time. In other words, the detection circuit is locked to avoid a leakage circuit generated for the human body due to the continuous detection and reduce the harm to human body.

In some embodiments, the timing circuit comprises a second capacitor, a second charging loop configured to charge the second capacitor, and a voltage limit element, wherein the timing circuit is configured to enable the voltage threshold circuit and the first control circuit only when the voltage of the second capacitor is lower than the voltage limit element.

The embodiments use the capacitor to clock the total length of time of detection status, which is simple to implement and costs less.

In some embodiments, the timing ranges from 275 milliseconds when the input voltage is 230 volts to 800 milliseconds when the input voltage is 90 volts.

The embodiments specifically define the total length of time of detection status. With reference to the above detection period under different input voltages, the total detection is only 4 times or so, which reduces the detection current passing by the human body.

In some embodiments, the timing circuit also comprises a second discharging loop configured to discharge the second capacitor when the detection circuit is not connected to the input voltage.

The embodiments define that the total length of time of detection status can be reset only when the detection circuit is powered off, which protects human safety.

In some embodiments, the voltage detector is configured to detect the voltage of the impedance to determine whether a further impedance, apart from the tube, is linked to the impedance connected across two ends of the tube. When the voltage is greater than the first threshold, it determines the absence of the further impedance apart from the tube. When the voltage is smaller than the first threshold, it determines the presence of the further impedance apart from the tube.

In some embodiments, a rectifier bridge is included, wherein the voltage threshold circuit, the first control circuit and the impedance are configured to: connect to the output of the rectifier bridge to receive the input voltage of the full-wave rectification; or connect to the input of the rectifier bridge to receive the input voltage of the half-wave rectification. In the embodiments, the RMS value for the leakage current can be reduced by means of the full-wave or half-wave detection method.

The implementation offers to apply the embodiments of the present disclosure into detecting one-end touch by humans.

According to a further aspect of the present disclosure, there is provided a LED tube, including any of the aforementioned detection circuit for tubes. The LED tube is connected to the mains supply with the RMS value ranging from 90V to 230V.

By using some embodiments of the present disclosure, there is provided a novel detection circuit for LED tube, wherein the detection circuit can detect whether a person contacts the LED supply loop under the protection of human.

According to a second aspect of the present disclosure, there is also provided a LED tube including the aforementioned detection circuit. The LED tube is connected to the mains supply and comprises a LED light source and a LED driving circuit for driving the LED light source, wherein the detection circuit initiates the LED driving circuit upon detecting that the voltage of the impedance is greater than the first threshold, i.e., the LED driving circuit is initiated only when there is no impedance, thereby enhancing safety.

In a further embodiment, the input of the LED tube is located at two ends of the LED tube and this embodiment significantly reduces the risk of touching one end of the two-end-feeding LED tube.

It should be understood that this part is not aiming to identify key or vital features of the embodiments of the present disclosure, or to limit the scope of the present disclosure. Other features of the present disclosure can be easily understood by one of ordinary skill in the art in view of the detailed description to follow.

BRIEF DESCRIPTION OF THE DRAWINGS

The above and other advantages, features, and/or objectives of the present disclosure will become more apparent upon review of the following detailed description together with the accompanying drawings, wherein.

In all the drawings, same or similar reference numerals may represent same or similar elements.

DETAILED DESCRIPTION

It should be appreciated that below detailed description is merely to enable those skilled in the art to better understand and further implement example embodiments disclosed herein and is not suggesting any restrictions on the scope of the present disclosure. The content of the present disclosure described herein can be implemented by various manners besides the following explained ones.

As used herein, the term "include(s)" and its variants are to be read as open-ended terms that mean "include(s), but is not limited to." The term "based on" is to be read as "based at least in part on." The term "one example embodiment" is to be read as "at least one example embodiment." The term "a further embodiment" is to be read as "at least one further embodiment."

Generally speaking, some embodiments of the present disclosure involve the detection circuit used in the LED tube. The detection circuit detects whether a person contacts the supply loop at a voltage greater or lower than the human safety voltage (e.g., 36V), to prevent the users from the risk of getting an electrical shock. Based on the detection result of the detection circuit, the LED driving circuit can determine whether the LED is driven or not.

Figure 1:
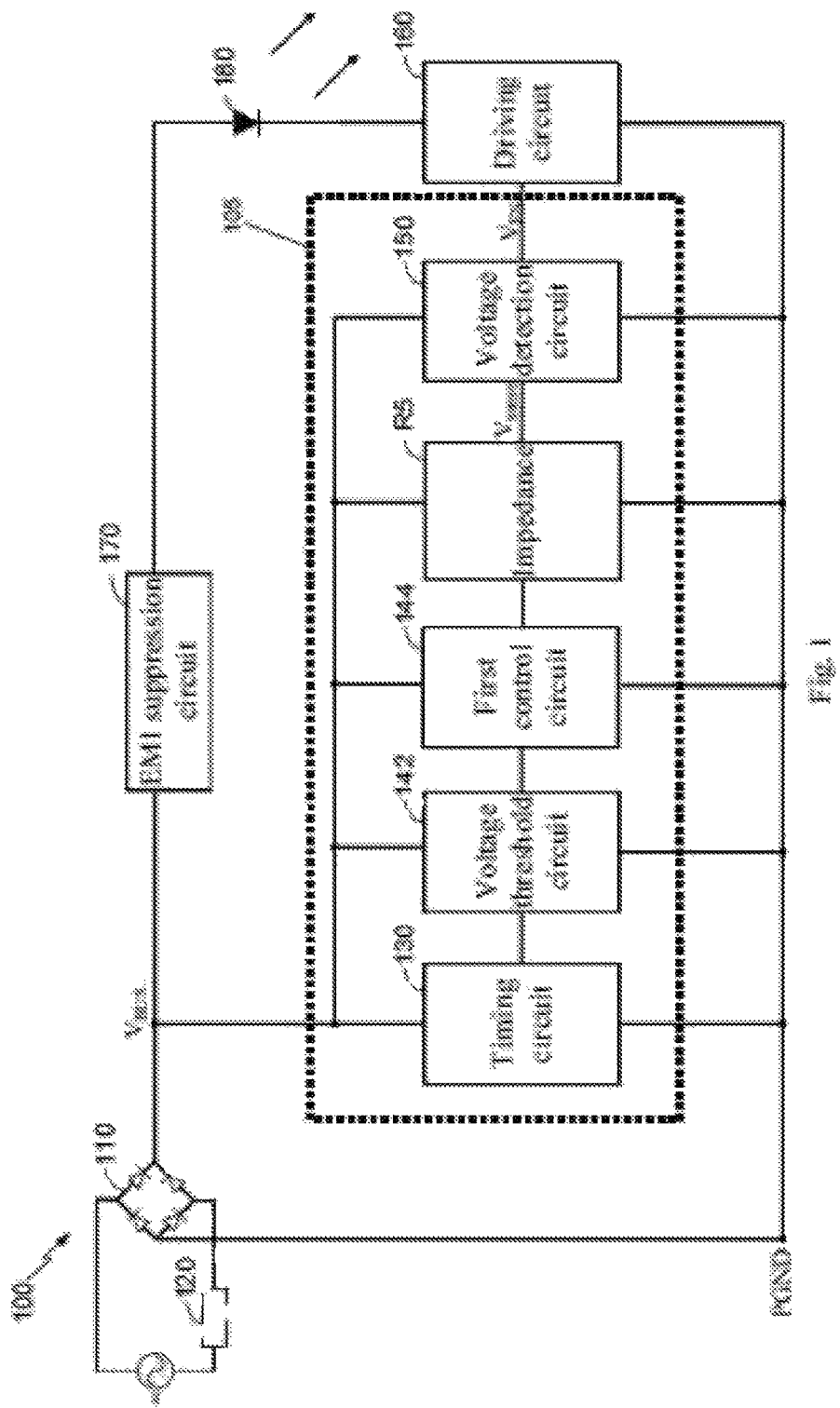
FIG. 1 is a schematic diagram of a LED tube circuit according to an embodiment of the present disclosure.

FIG. 1 shows a block diagram of a LED tube circuit 100 according to an embodiment of the present disclosure. The circuit 100 comprises a rectifier circuit 110, an EMI suppression circuit 170, a voltage threshold circuit 142, a first control circuit 144, an impedance R5, a timing circuit 130, a voltage detection circuit 150, a driving circuit 160 and a LED 180. In an embodiment of the present disclosure, voltage threshold circuit 142, first control circuit 144, impedance R5, timing circuit 130, and voltage detection circuit 150 may constitute a detection circuit 105, which will be described in details as follows. When the LED tube is powered on, the alternating currents provided by the mains alternating supply AC is rectified by the rectifier circuit 110. The root-mean-square (RMS) of the mains alternating voltage AC can be from 90V to 230V, such as 220V. The rectified direct voltage $V_{BUS}$ is provided to the EMI suppression circuit 170, the timing circuit 130, the voltage threshold circuit 142, the first control circuit 144, the impedance R5 and the voltage detection circuit 150. The detection circuit 105 detects whether a person contacts the supply loop. If someone contacts the supply loop, it is equivalent to connecting an impedance 120 between the rectifier circuit 110 and the alternating current source AC; if no one contacts the supply loop, there is no impedance 120 between the rectifier circuit 110 and the alternating current source AC. Note that during detection, the LED 180 and the driving circuit 160 are not in operation mode or no electric current is conducted therethrough.

The impedance R5 can be used to divide the voltage with the possible human body impedance 120 and the detection circuit 105 detects the voltage of the impedance R5 and generates a detection signal $V_{SENSE}$. The voltage detection circuit 150 detects the voltage $V_{SENSE}$ and generates a signal $V_{EN}$ to selectively enable the driving circuit 160, so as to selectively drive the LED 180. For example, when the $V_{SENSE}$ signal is greater than the threshold voltage, it means the mains supply is completely applied to detect the impedance and no one contacts the LED tube supply loop and the driving circuit 160 can drive the LED 180. On the contrary, when the $V_{SENSE}$ signal is not greater than the threshold voltage, it means there may be human body contact on the LED tube supply loop and only a part of the mains supply is applied to detect the impedance and the driving circuit 180 is disabled; therefore, the LED 180 cannot be driven. It can be appreciated that the driving circuit 160 can be any currently known or later developed driving circuits that can be used for driving the LED 180. As seen from FIG. 1, the LED light source 180 and the LED driving circuit 160 are in a series connection, and the series connection is in parallel with the detection circuit, especially in parallel with the impedance R5, between $V_{BUS}$ and PGND.

In particular, the voltage threshold circuit 142, the first control circuit 144, the impedance R5 and the voltage detection circuit 150 operate only when the input voltage is relatively low (e.g., lower than 30.0 Volts).

Figure 2:
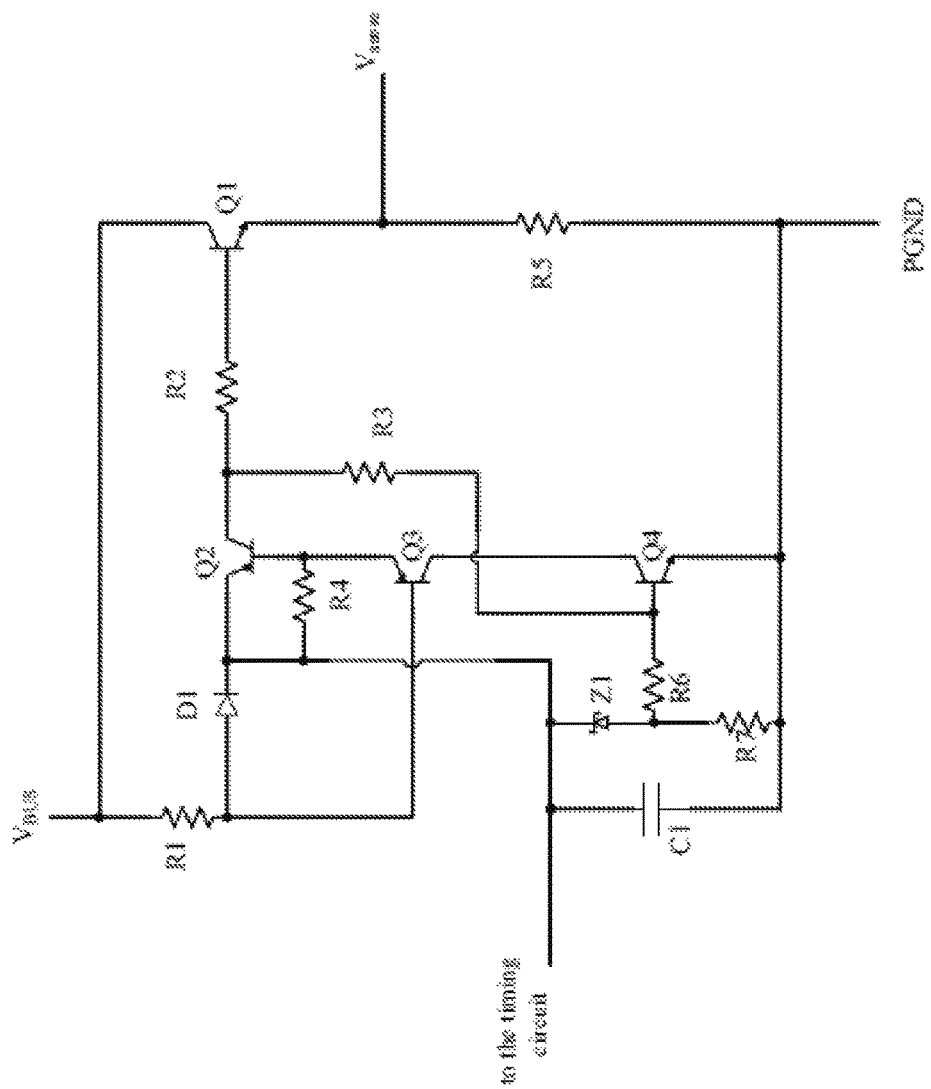
FIG. 2 is a schematic circuit diagram of an example of a voltage threshold circuit, a first control circuit and an impedance in FIG. 1.

FIG. 2 illustrates a schematic circuit diagram of an example of a voltage threshold circuit 142, a first control circuit 144 and impedance R5 in FIG. 1. In the example of FIG. 2, the voltage threshold circuit 142 can comprise a capacitor C1; the first control circuit 144 can comprise transistors Q2 and Q3; the impedance R5 is connected between the input voltage $V_{BUS}$ and the power ground PGND via the transistor Q1.

The rectified $V_{BUS}$ charges the capacitor C1 through the resistor R1 and the diode D1 and the voltage of the capacitor C1 gradually increases. When the voltage of the capacitor C1 reaches the reverse breakdown voltage of the Zener diode Z1, the current flows through the resistor R7 and the voltage of the resistor R7 gradually climbs up.

The first control circuit may comprise transistors Q2 and Q3 and the second control circuit may comprise a transistor Q4. When voltage of the resistor R7 reaches to a certain value, the transistor Q4 is switched on. At this time, $V_{BUS}$ is still greater than the voltage of the capacitor C1 and continues to charge the capacitor C1. The voltage of the capacitor C1 subsequently reaches the peak, e.g., 30V. With the decrease of $V_{BUS}$, the current provided by the $V_{BUS}$ is insufficient for the consumption of the resistors R7 and R6. By this time, the voltage of the capacitor C1 is also greater than the breakdown voltage of the Zener diode Z1 and the break-over voltage of the transistor Q4; therefore, Q4 is switched on and the power continues to supply. The voltage of the capacitor C1 reduces accordingly.

The Zener diode Z1, capacitor C1 and resistor R1 are configured such that the time required for the initial charge of C1 to reach the reverse breakdown voltage (i.e., starting voltage) of the Zener diode Z1 ranges from about 90 ms to about 260 ms. Besides, the circuit in FIG. 2 can be configured to allow the current passing through the rectifier 110 to be lower than the safety current for human body, such as lower than 10 mA, during the above operation process. It can be understood that the above is just an example, and Zener diode, capacitor and resistor can implement the resistance, capacitance and the function of conducting above the threshold in any manners, e.g., the resistor R1 can be comprised of a plurality of resistors in series.

$V_{BUS}$ gradually reduces along with the decrease of the input voltage. When the voltage of the capacitor C1 is larger than $V_{BUS}$, e.g., the voltage of the capacitor C1 is greater than the sum of the $V_{BUS}$ and the break-over voltage (Veb) of the transistors Q2 and Q3, the transistors Q2 and Q3 are switched on and the transistor Q1 is also turned on subsequently. At this time, the capacitor C1 is discharged. The capacitor C1 has two discharging loops and can be discharged via the resistor R4 and transistors Q3 and Q4 and via the transistor Q2, resistor R2 and transistor Q1.

When the transistor Q1 is turned on, the detection begins. The current passes through the resistor R5 and the possible human body impedance to form a detection voltage $V_{SENSE}$ on the resistor R5. When the human body contacts the supply loop, the resistor R5 and the possible human body impedance 120 form a voltage-dividing circuit. In one example, the resistance of resistor R5 is much smaller than the human body impedance, so $V_{SENSE}$ is much smaller than the RMS of the mains alternating voltage AC, such as $V_{SENSE}$=1.0 V. Comparatively speaking, when the human body does not contact the supply loop, $V_{SENSE}$ is high (such as 25.0 V), because there is no impedance 120 to divide the voltage. The driving circuit 160 can have a voltage detector to detect $V_{SENSE}$. When $V_{SENSE}$ (e.g., 1.0 V) is not greater than the threshold voltage (e.g., 10.0 V), the driving circuit 160 will not drive LED 180; however, when $V_{SENSE}$ (e.g., 25.0 V) is greater than the threshold (e.g., 10.0 V), the driving circuit 160 drives the LED 180.

During discharge, when the voltage of the capacitor C1 is less than the sum of the reverse breakdown voltage of the Zener diode Z1 and the base-emitter voltage (Vbe) of the transistor Q2, then transistor Q2 is still switched on. The current flows into the transistor Q4 through the resistor R3 to maintain the conduction of the transistor Q4. When the voltage of the capacitor C1 is below $V_{BUS}$, the transistor Q3 is cut off and the transistors Q2 and Q4 are also cut off subsequently. By this time, the voltage of C1 is lower than the reverse breakdown voltage of the Zener diode Z1 (i.e., starting voltage). The resistors R2 and R4 and the transistors Q1-Q4 are configured to set the time required for discharging the first capacitor to be below the starting voltage as less than one millisecond. Accordingly, the entire circuit is operated under the threshold of the human safety voltage (e.g., 30.0 V) during the discharge process, thereby protecting the human body from the risk of getting an electrical shock.

Afterwards, the next detection can proceed. $V_{BUS}$ recharges the capacitor C1 in the new period to repeat the above process. It should be understood that the charge in the following period starts from a low voltage value (e.g., 7.0 V) rather than 0V in the first charge because the capacitor C1 is not fully discharged in the first discharge process. Therefore, the time required for charging to the starting voltage (e.g., 50 ms) is shorter than the time required for the initial charge to reach the starting voltage (e.g., 200 ms) in the following charge process. It can be appreciated that the time required for charging to the starting voltage in the following periods can be selected between about 50 ms and about 200 ms. Additionally, it can be understood that the schematic circuit diagram in FIG. 2 is only exemplary and other similar circuits can also be used to execute similar function.

Figure 3:
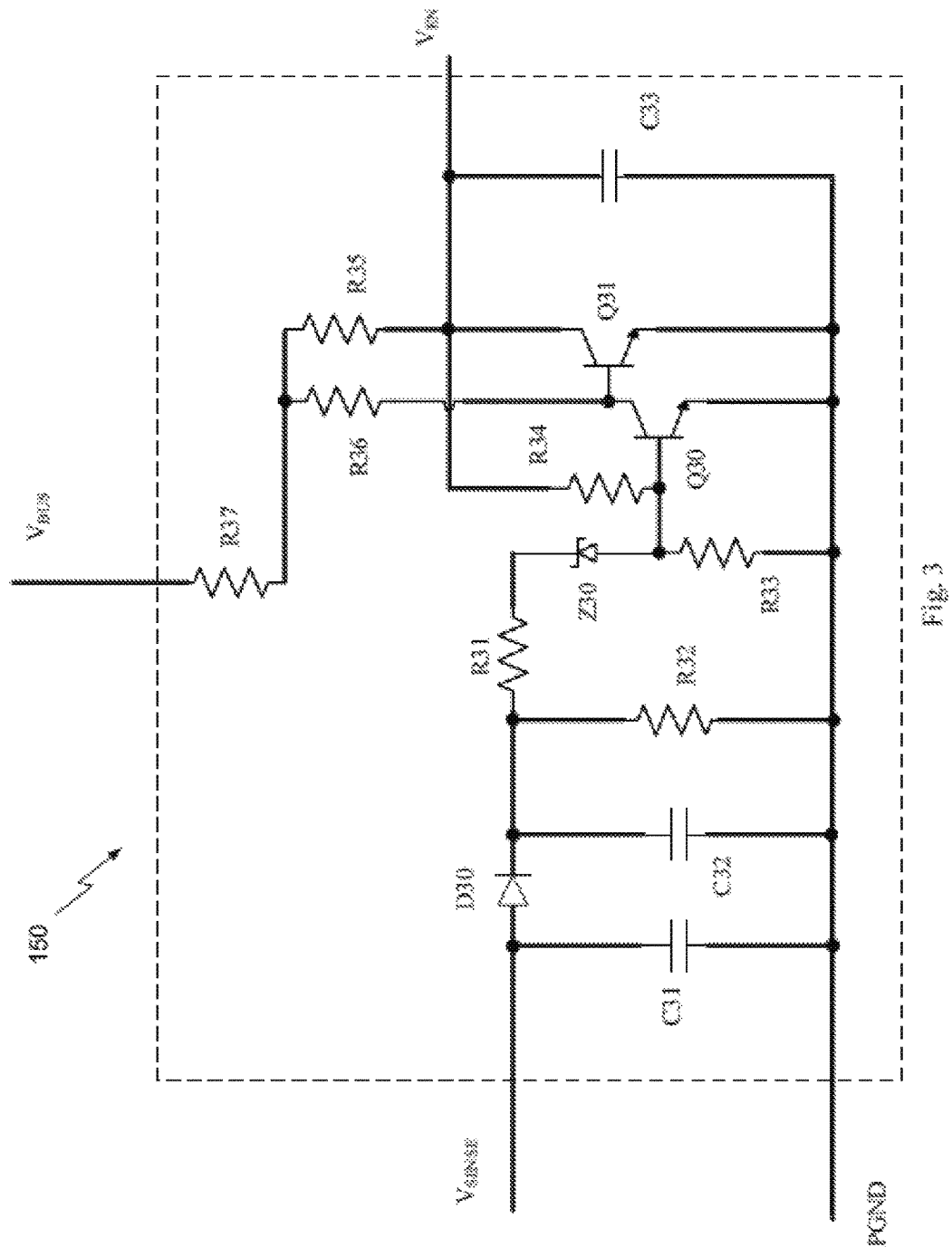
FIG. 3 is a schematic circuit diagram of an example of a voltage detection circuit in FIG. 1.

FIG. 3 shows a schematic circuit diagram of an example of a voltage detection circuit in FIG. 1. The voltage detection circuit 150 comprises capacitors C31-32, resistors R31-R33 and a Zener diode Z30. The voltage detection circuit 150 is configured to detect the voltage of the impedance R5 upon reaching the starting voltage (e.g., 30.0 V).

As illustrated in FIG. 3, the impedance R5 outputs $V_{SENSE}$ (e.g., 25.0 V) when no one contacts the supply loop, and the capacitor C31 in the voltage detection circuit 150 filters $V_{SENSE}$. The filtered voltage charges the capacitor C32. After the capacitor C1 is discharged, the charge in a plurality of periods make the voltage of the capacitor C32 reach the reverse breakdown voltage of the Zener diode Z30. When the Zener diode Z30 has a reverse breakdown, the current passes through the resistor R33 to generate voltage thereon. Afterwards, the transistor Q30 is switched on and the base voltage of the transistor Q31 is pulled down to the power ground PGND. Therefore, the transistor Q31 is switched off and $V_{EN}$ outputs a high voltage equal to $V_{BUS}$ (substantially different from the voltage of the power ground PGND).

Conversely, when human body contacts the supply loop, the charging voltage of the capacitor C32 fails to reach the reverse breakdown voltage of the Zener diode Z30 because $V_{SENSE}$ is low (e.g., 1.0 V); therefore, the transistor Q30 is cut off, the transistor Q31 is switched on and $V_{EN}$ is pulled down to the power ground PGND. The driving circuit 160 can be enabled or disabled according to the voltage value of $V_{EN}$. The voltage detection circuit 150 detects the voltage of the impedance accordingly, to determine whether a further impedance, apart from the tube, is connected to the impedance across the two ends of the tube. When the voltage is greater than the first threshold, it determines the absence of the impedance apart from the tube; and when the voltage is lower than the first threshold, it determines the presence of the impedance apart from the tube.

It should be noted that voltage comparison can also be implemented by other manners, such as integrated operational amplifier.

On the basis of the above intermittent detection, the number of intermittent detection can be further limited by defining the total time for detection. The timing circuit 130 in FIG. 1 is provided to implement this function.

Figure 4:
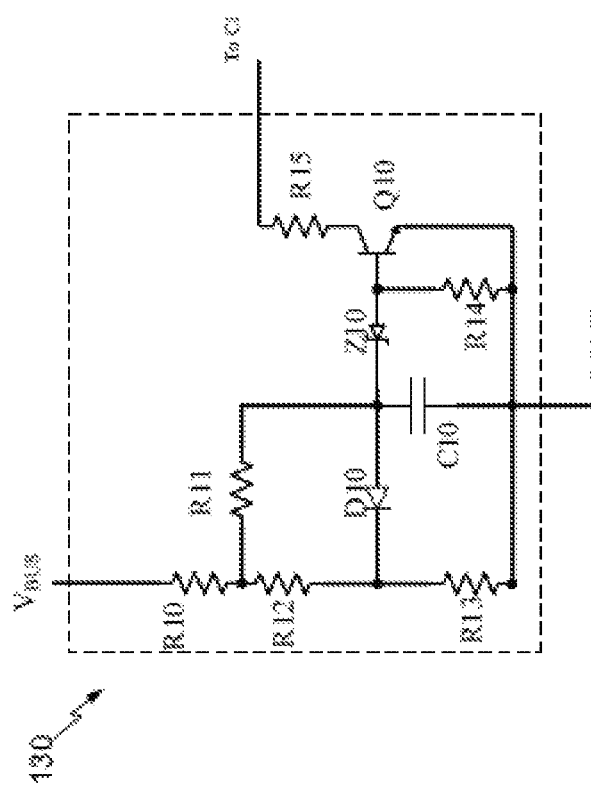
FIG. 4 is a schematic circuit diagram of an example of a timing circuit in FIG. 1.

FIG. 4 illustrates a schematic circuit diagram of an example of a timing circuit 130 in FIG. 1. The timing circuit comprises resistors R10-R15, a diode D10, a capacitor C10, a Zener diode Z10 and a transistor Q10. The timing circuit is configured to enable the voltage threshold circuit and the first control circuit before the timing expires, and to disable the voltage threshold circuit and the first control circuit after the timing expires.

When the rectified input voltage $V_{BUS}$ is input into the timing circuit 130, the capacitor C10 is charged. Before the capacitor C10 is fully charged, the Zener diode Z10 is not reversely broken down, so the transistor Q10 is not switched on. Here, the Zener diode Z10 is operated as a voltage limit element. At this time, the capacitor C1 in the voltage threshold circuit 142 is not discharged via the transistor Q10.

When the capacitor C10 is fully charged (i.e., the timing expires), the Zener diode Z10 is reversely broken down, so the transistor Q10 is switched on. The capacitor C1 in the voltage threshold circuit 142 is rapidly discharged through the transistor Q10 and the capacitor C1 is short-circuited accordingly. After the capacitor C1 is short-circuited, the voltage threshold circuit 142, first control circuit 144, impedance R5 and voltage detection circuit 150 also stop working subsequently. As long as the alternating current supply AC exists, the voltage of capacitor C10 continues to present, such that the capacitor C1 cannot be charged to the starting voltage. Therefore, the voltage threshold circuit 142, first control circuit 144, impedance R5 and voltage detection circuit 150 will not operate.

It can be understood that the timing circuit is configured such that the timing ranges from about 275 milliseconds to about 800 milliseconds, thereby allowing the voltage detection circuit to detect three to four times. Regarding this, when the LED 180 operates normally, the voltage threshold circuit 142, first control circuit 144, impedance R5 and voltage detection circuit 150 are disabled to reduce power consumption.

When the power is off, e.g., when the LED tube is disconnected from the alternating current supply AC, the electric energy stored on the capacitor C10 can be rapidly discharged via the second discharging loop consisting of a transistor D10 and a resistor R13. The discharge is completed within 400 ms for example.

Figure 5:
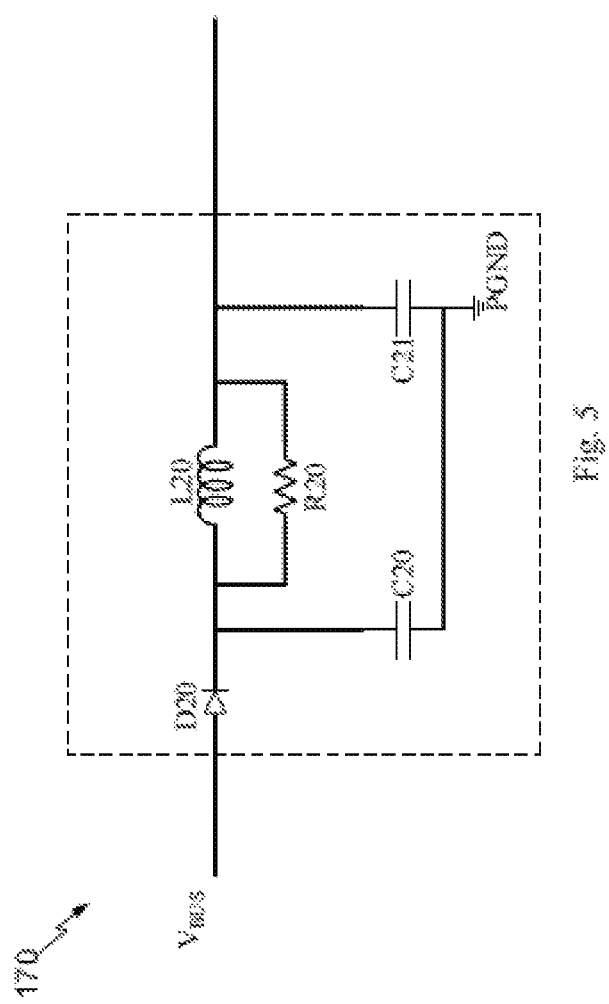
FIG. 5 is a schematic circuit diagram of an example of an EMI circuit in FIG. 1.

FIG. 5 shows a schematic circuit diagram of an example of an electromagnetic interference (EMI) suppression circuit 170 in FIG. 1. The EMI suppression circuit 170 comprises a diode D20, capacitors C20 and C21, an inductor L20 and a resistor R20 and is configured to suppress EMI. In addition, when a human body joins the circuit, the driving circuit 160 stops working and the capacitors C20 and C21 will not have a discharging loop due to the presence of the diode D20. Regarding this, the whole detection circuit corresponds to a pure resistive circuit, in which the input current is substantially consistent with the actual current consumption and the power factor (PF) is approximately 1.

Relatively speaking, if there is no diode D20, the entire detection circuit corresponds to a resistance-capacitance circuit. Thus, the PF value is quite low and the input effective current is greater than the actual current consumption. From the perspective of circuit, the actual current consumption is the same regardless of the presence of the diode D20, but the leakage current passing through the human body is the input effective current. Thus, the leakage current passing through the human body will increase due to a lack of diode D20.

Figure 6:
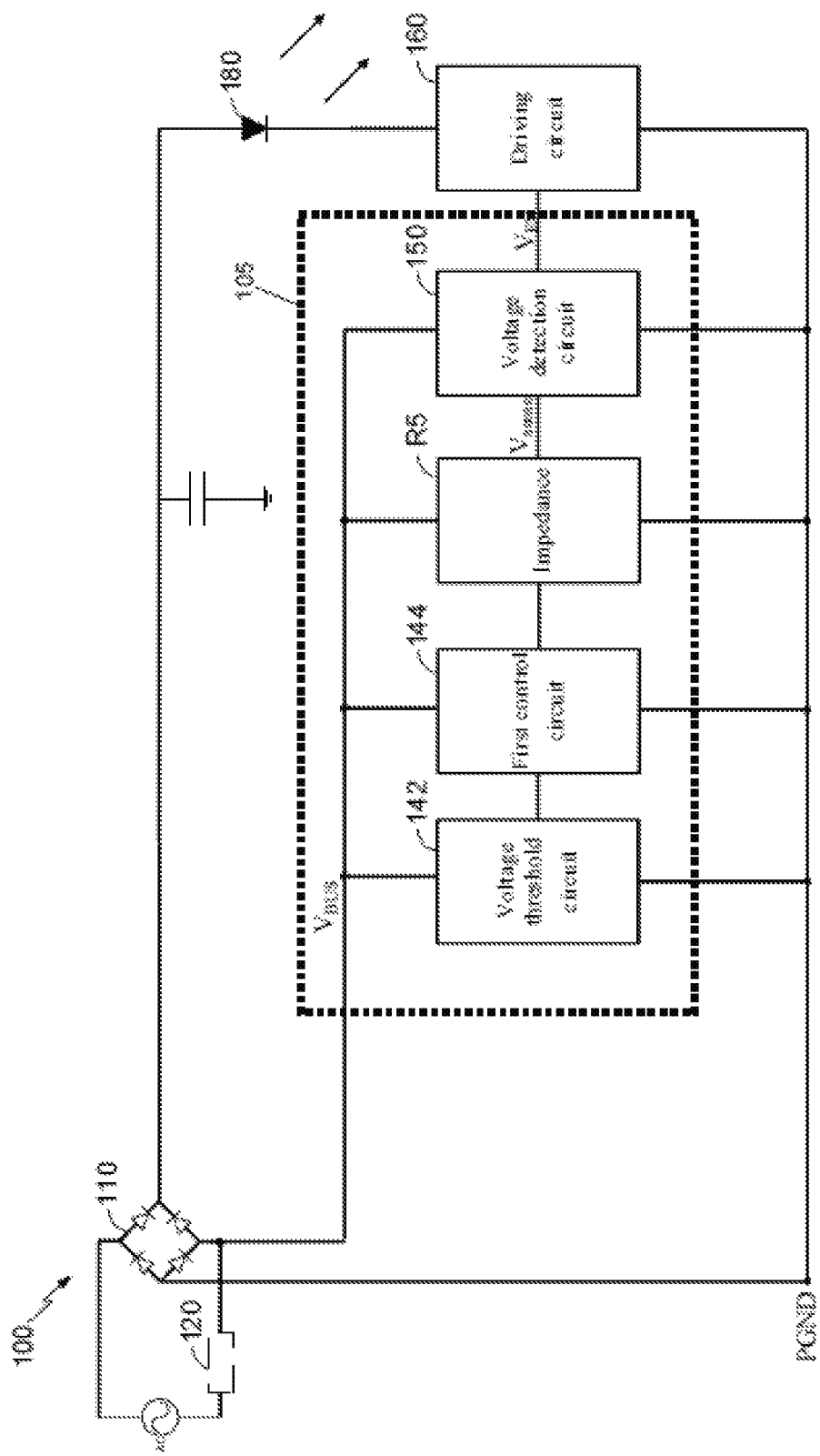
FIG. 6 is a schematic diagram of a LED tube circuit according to a further embodiment of the present disclosure.

FIG. 6 illustrates a block diagram of an LED tube circuit 100 according to a further embodiment of the present disclosure. The circuit 100 comprises a rectifier circuit 110, a voltage threshold circuit 142, a first control circuit 144, an impedance R5, a voltage detection circuit 150, a driving circuit 160 and an LED 180. Compared with the circuit shown in FIG. 1, the difference lies in that: the detection circuit is directly connected to the output of the rectifier bridge 110, to obtain the mains alternating supply AC rectified by half-wave. Besides, there is no timing circuit 130, such that the detection circuit can continue to operate to detect the voltage of the impedance. The detection circuit can detect whether a human body contacts the tube during the installation and use of the tube, thereby constantly protecting human safety. In the circuit of FIG. 6, the alternating cycle is 50 Hz and the peak current is a half-wave peak current, which reduces the RMS value of the leakage current. The root-mean-square (RMS) of the mains alternating voltage AC can be from 90V to 230V, such as 220V. In an embodiment of the present disclosure, the voltage threshold circuit 142, the first control circuit 144, the impedance R5, and the voltage detection circuit 150 may constitute a detection circuit 105, which is to be described as follows. When the LED tube is powered on, the alternating currents provided by the mains alternating supply AC are rectified by the rectifier circuit 110. The half wave in the AC becomes a direct voltage $V_{BUS}$, which is provided to detection circuit 105 (or to voltage threshold circuit 142, first control circuit 144, impedance R5 and voltage detection circuit 150). The detection circuit 105 detects whether a person contacts the supply loop. If someone contacts the supply loop, it is equivalent to connecting the impedance 120 between the rectifier circuit 110 and the alternating current source AC; if no one contacts the supply loop, there is no impedance 120 between the rectifier circuit 110 and the alternating current source AC.

Figure 7:
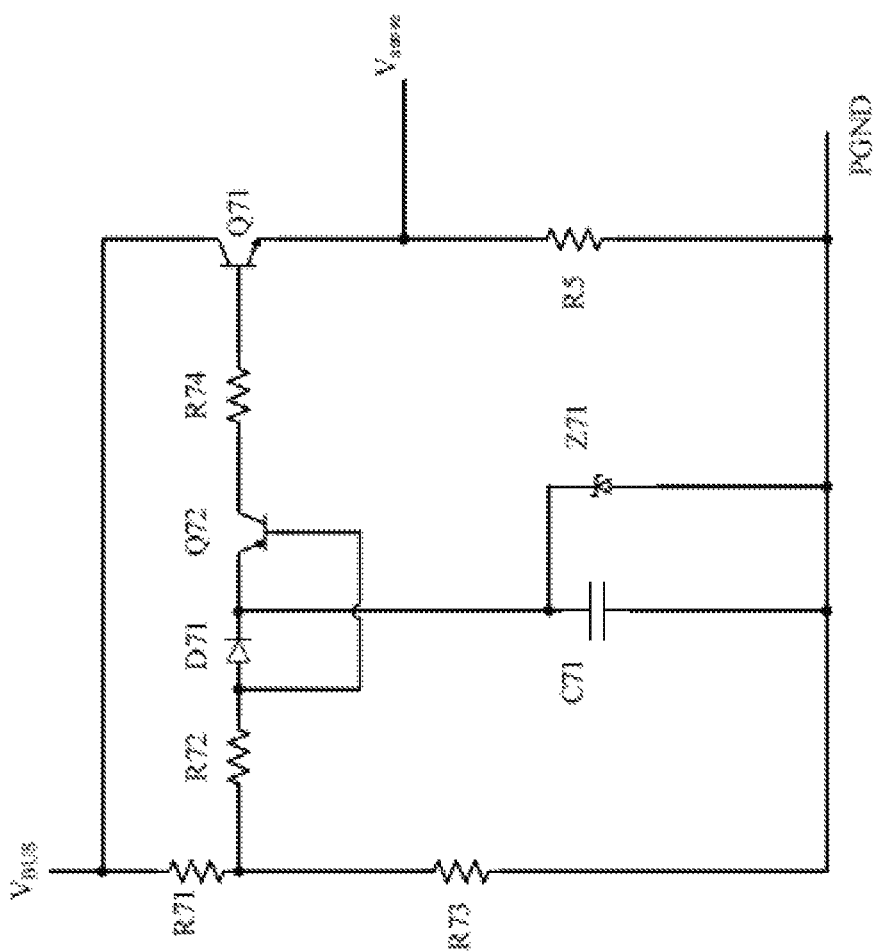
FIG. 7 is a schematic circuit diagram of an example of a voltage threshold circuit, a first control circuit and an impedance in FIG. 6.

FIG. 7 shows a schematic circuit diagram of an example of a voltage threshold circuit 142, a first control circuit 144 and an impedance R5 in FIG. 6. In the example of FIG. 7, the voltage threshold circuit 142 can comprise a capacitor C71; the first control circuit 144 can comprise a transistor Q72; and the impedance R5 is connected between the input voltage $V_{BUS}$ and the power ground PGND via the transistor Q71. The Zener diode Z71 clamps the voltage of the capacitor C71, such that the detection circuit operates under the human safety voltage (e.g., not higher than 30.0 V).

The $V_{BUS}$ after the half-wave rectification is divided by the resistors R71 and R72, wherein the resistance value of the resistor R72 is far greater than (e.g., more than 10 times) that of the resistor R71. The half-wave rectified $V_{BUS}$ charges the capacitor C71 via the resistors R71 and R72 and the diode D71. The voltage of the capacitor C71 gradually increases and is maintained in that trend. However, the half-wave rectified $V_{BUS}$ lowers along with the decrease of the AC alternating voltage. The voltage of the base of Q72 reduces in accordance with the decrease of the AC alternating voltage. When the voltage of the capacitor C71 increases to be greater than the sum of the voltage of the base of Q72 (approximately equivalent to the voltage of the resistor R73) and the voltage drop (0.7V) of the diode D71, the transistor Q72 is switched on. At this time, the charges on the capacitor C71 flow into the base of the transistor Q72 via the emitter of the transistor Q72 and continue to flow through the resistors R72 and R73.

Now, the current flowing out of the collector of the transistor Q72 is β (β>1) times more than the current flowing out of the base of the transistor Q72. The current flowing out of the collector of the transistor Q72 then flows into the transistor Q71, thereby switching on the transistor Q71 and allowing the current to pass through the resistor R5. As mentioned above, the charges on the capacitor C71 will not be immediately released because the resistance value of the resistor R73 is quite large. Therefore, the charges on the capacitor C71 maintain the conduction of the transistors Q72 and Q71. When the transistor Q71 is switched on, the detection begins. The current passes through the resistor R5 and the possible human body impedance to form a detection voltage $V_{SENSE}$ on the resistor R5. When the human body contacts the supply loop, the resistor R5 and the possible human body impedance 120 form a voltage-dividing circuit. In one example, the resistor is far smaller than the human body impedance, so $V_{SENSE}$ is extremely small, such as 1.0 V. Comparatively speaking, when the human body does not contact the supply loop, $V_{SENSE}$ is high (such as 25.0 V) because there is no impedance 120 to divide the voltage. The driving circuit 160 can have a voltage detector to detect $V_{SENSE}$. When $V_{SENSE}$ (e.g., 1.0 V) is not greater than the threshold (e.g., 10.0 V), the driving circuit 160 will not drive LED 180; however, when $V_{SENSE}$ (e.g., 25.0 V) is greater than the threshold (e.g., 10.0 V), the driving circuit 160 drives the LED 180.

In the embodiment of FIG. 7, the detection circuit is always working due to a lack of timing circuit 130 as shown in FIG. 4.

Figure 8:
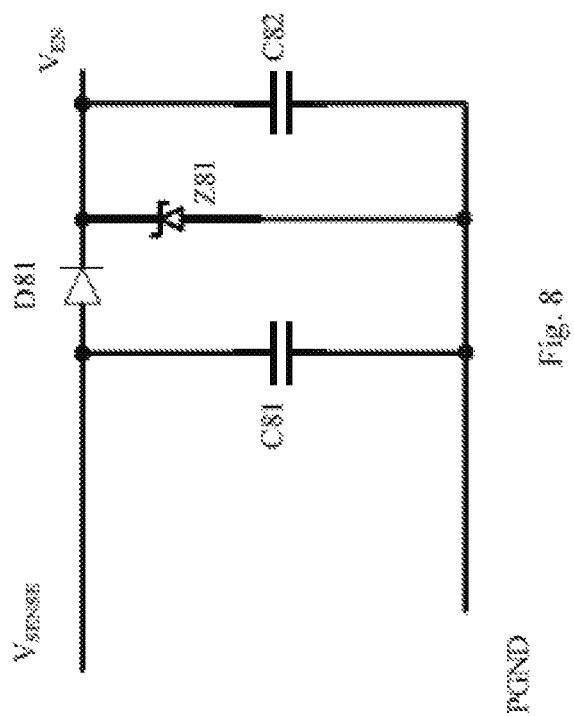
FIG. 8 is a schematic circuit diagram of an example of a voltage detection circuit in FIG. 6.

FIG. 8 illustrates a schematic circuit diagram of an example of a voltage detection circuit in FIG. 7. The voltage detection circuit 150 comprises capacitors C81-82, a diode D81, and a Zener diode Z81 and is configured to detect the voltage of the impedance R5 upon reaching the starting voltage (e.g., 30.0 V).

As shown in FIG. 8, the impedance R5 outputs $V_{SENSE}$ (e.g., 25.0 V) when no one contacts the supply loop, and the capacitor C81 in the voltage detection circuit 150 filters $V_{SENSE}$. The filtered voltage charges the capacitor C82. When the C82 is charged to be greater than the threshold enabling voltage (e.g., 15.0 V), the driving circuit 160 receives the enabling voltage $V_{EN}$ and drives the LED 180.

Conversely, when human body contacts the supply loop, the charging voltage of the capacitor C82 can only be charged to the maximum 1.0 V because $V_{SENSE}$ is low (e.g., 1.0 V), wherein the voltage is below the threshold enabling voltage of the driving circuit 160. Therefore, the driving circuit cannot drive the LED 180. The Zener diode Z81 clips the charging voltage of the capacitor C82 to protect the driving circuit 160. Therefore, it can be appreciated that the Zener diode Z81 is optional in the detection circuit 160. For example, when the driving circuit 160 has a protective function for the input voltage, the Zener diode Z81 can be omitted. The voltage detection circuit 150 detects the voltage of the impedance, to determine whether a further impedance, apart from the tube, is connected to the impedance across the two ends of the tube. When the voltage is greater than the first threshold, it determines the absence of the impedance apart from the tube; and when the voltage is lower than the first threshold, it determines the presence of the impedance apart from the tube.

It should be noted that voltage comparison can also be implemented by other manners, such as integrated operational amplifier.

It should be understood that the circuit in FIGS. 2-8 are only exemplary and other circuit configurations can also be used to implement similar functions. For example, in the embodiments of the present disclosure, the field effect transistor can replace the bipolar transistor in FIGS. 2-8 and the series-connected resistors can replace the single resistor in FIGS. 2-8, and the parallel-connected capacitors can replace the single capacitor in FIGS. 2-8. It should be appreciated that simple conversion of the circuit and circuit elements in FIGS. 2-8 falls within the protection scope of the present disclosure.

Generally speaking, various embodiments of the present disclosure can be implemented by hardware, dedicated circuit, software, logic or any random combinations thereof. Some aspects can be implemented by hardware while other aspects can be implemented by firmware or software, wherein the firmware or software can be executed by controller, microcontroller or other computing device. Although each aspect of the present disclosure has been illustrated and described as block diagram and flow chart or represented by other drawings, it should be understood that the block, device, system, technique or method depicted in the text can be implemented by hardware, software, firmware, dedicated circuit, logic, universal hardware, controller, or computing device or some combinations thereof in a non-restrictive manner.

Furthermore, although the operations are described in a particular sequence, it should not be understood that these operations must be executed in the shown particular sequence or in a sequence, or the expected results can be achieved only by executing all indicated operations. In some cases, multitasking and parallel processing can be beneficial.

Similarly, although the details of several implementations have been included in the above discussion, they should be interpreted as feature description for the specific embodiments rather than any limitation to the scope of the present disclosure. Some features described in separate embodiments can also be executed in one single embodiment in combination. Conversely, various features described in the single embodiment can also be separately implemented in a plurality of embodiments or in any suitable sub-combinations.

Although the present disclosure is described by specific structural features and/or method actions, it should be appreciated that the present disclosure defined in the attached claims is not limited to the above features or actions, which are disclosed only as the example forms for implementing the claims.

We claim:

1. A voltage detection circuit, comprising:
    an impedance coupled between inputs of an LED tube;
    a voltage detector configured to detect a voltage across the impedance;
    a voltage threshold circuit configured to provide a threshold voltage;
    a first control circuit configured to compare an input voltage across the inputs of the tube to the threshold voltage, and to control the voltage detector to detect the voltage across the impedance when the input voltage is less than the threshold voltage; and
    a second control circuit configured to enable the voltage detector when the voltage threshold circuit is charged to a starting voltage;
    wherein the voltage threshold circuit comprises a first capacitor and the detection circuit comprises,
        a first charging loop configured to charge the first capacitor to reach the starting voltage; and
        the first control circuit further comprises a transistor adapted to connect the impedance between the input voltage and a power ground, and the transistor is adapted to be turned on to begin the detection and is adapted to be turned off when not detection.

2. The detection circuit according to claim 1, wherein the threshold voltage is not greater than 30 volts.

3. The detection circuit according to claim 1, wherein the first control circuit is configured to compare the input voltage with the starting voltage that acts as the threshold voltage, and to control the voltage detector to detect the voltage across the impedance when the input voltage is less than the starting voltage, wherein the first control circuit is adapted to decouple the impedance from the inputs before the detection and to couple the impedance between the input during the detection.

4. The detection circuit according to claim 1, wherein the first charging loop is configured to set a time required for an initial charge of the first capacitor to reach the starting voltage as:
    from 90 milliseconds when the input voltage is 230 volts;
    to
    260 milliseconds when the input voltage is 90 volts.

5. The detection circuit according to claim 4, wherein the detection circuit comprises a first discharging loop configured to discharge the first capacitor when the voltage detector starts detection.

6. The detection circuit according to claim 5, wherein the first discharging loop is configured to set the time for discharging the first capacitor to be less than the starting voltage as less than 1 millisecond, and the first charging loop is configured to set the time range required for recharging the discharged first capacitor to reach the starting voltage as:
    from 50 milliseconds when the input voltage is 230 volts;
    to
    200 milliseconds when the input voltage is 90 volts.

7. The detection circuit according to claim 1, wherein the voltage detector is configured to detect the voltage across the impedance to determine whether a further impedance, apart from the LED tube, is linked to the impedance connected across the inputs of the LED tube; whereby, when the voltage is greater than a first threshold, the voltage detector determines the absence of the further impedance apart from the LED tube; and whereby, when the voltage is less than the first threshold, the voltage detector determines the presence of the further impedance apart from the LED tube.

8. The detection circuit according to claim 1, further comprising a rectifier bridge, wherein the voltage threshold circuit, the first control circuit and the impedance are configured to:
    connect to an output of the rectifier bridge to receive an input voltage of full-wave rectification; or
    connect to an input of the rectifier bridge to receive an input voltage of half-wave rectification.

9. The detection circuit according to claim 1, at least partially implemented in an integrated circuit.

10. An LED tube, comprising the detection circuit for the tube in claim 1, wherein the LED tube is connected to a mains supply;
    the LED tube further comprising an LED light source and an LED driving circuit for driving the LED light source,
    wherein the detection circuit initiates the LED driving circuit when the voltage across the impedance is detected to be greater than a first threshold.

11. The LED tube according to claim 10, wherein the LED light source and the LED driving circuit are in a series connection, and the series connection is in parallel with the detection circuit, especially in parallel with the impedance of the detection circuit.

12. A voltage detection circuit, comprising:
    an impedance coupled between inputs of an LED tube;
    a voltage detector configured to detect a voltage across the impedance;
    a voltage threshold circuit configured to provide a threshold voltage;
    a first control circuit configured to compare an input voltage across the inputs of the tube to the threshold voltage, and to control the voltage detector to detect the voltage across the impedance when the input voltage is less than the threshold voltage; and a timing circuit configured to enable the voltage threshold circuit and the first control circuit before timing expires, and to disable the voltage threshold circuit and the first control circuit when timing is expired;
    wherein the timing circuit comprises a second capacitor, a second charging loop configured to charge the second capacitor, and a voltage limit element, wherein the timing circuit is configured to enable the voltage threshold circuit and the first control circuit when the voltage of the second capacitor is lower than a threshold of the voltage limit element.

13. The detection circuit according to claim 12, wherein the timing ranges:
    from 275 milliseconds when the input voltage is 230 volts; to
    800 milliseconds when the input voltage is 90 volts.

14. The detection circuit according to claim 12, wherein the timing circuit further comprises a second discharging loop configured to discharge the second capacitor when the circuit is not connected to the input voltage.

\* \* \* \* \*